United States Patent
Zhang et al.

(10) Patent No.: US 11,558,644 B2
(45) Date of Patent: Jan. 17, 2023

(54) RESTRICTIONS ON IN-LOOP FILTERING

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/368,972

(22) Filed: Jul. 7, 2021

(65) Prior Publication Data
US 2021/0337239 A1    Oct. 28, 2021

Related U.S. Application Data

(63) Continuation of application No. PCT/CN2020/077429, filed on Mar. 2, 2020.

(30) Foreign Application Priority Data

Mar. 2, 2019  (WO) ................ PCT/CN2019/076785

(51) Int. Cl.
*H04N 19/82*   (2014.01)
*H04N 19/117*  (2014.01)
(Continued)

(52) U.S. Cl.
CPC ........... *H04N 19/82* (2014.11); *H04N 19/117* (2014.11); *H04N 19/119* (2014.11);
(Continued)

(58) Field of Classification Search
CPC .... H04N 19/82; H04N 19/119; H04N 19/159; H04N 19/86; H04N 19/176; H04N 19/117; H04N 19/61; H04N 19/96
See application file for complete search history.

(56) References Cited

U.S. PATENT DOCUMENTS 8,929,462 B2   1/2015  Wang et al.
9,591,331 B2   3/2017  Chong et al.
(Continued)

FOREIGN PATENT DOCUMENTS

CN    104702951 A    6/2015
CN    106131549 A    11/2016
(Continued)

OTHER PUBLICATIONS

Bross, Benjamin. "Versatile Video Coding (Draft 1)" Joint Video Experts Team (JVET) of ITU-T SG 16 WP 3 and ISO/IEC JTC 1/SC 29/WG 11, 10th Meeting: San Diego, US, Apr. 10-20, 2018, Document JVET-J1001, 2018.
(Continued)

*Primary Examiner* — Joseph W Becker
(74) *Attorney, Agent, or Firm* — Perkins Coie LLP

(57) ABSTRACT

Devices, systems and methods for digital video coding, which includes: determining whether a sample is located at sub-block transform boundaries in case that a sub-block transform is applied; applying deblocking filter process if it is determined that the sample is located at sub-block transform boundaries; and performing a conversion between the video and a bitstream representation of the video.

20 Claims, 13 Drawing Sheets

Illustration of sub-block transform modes SBT-V and SBT-H

(51) Int. Cl.
H04N 19/119 (2014.01)
H04N 19/159 (2014.01)
H04N 19/176 (2014.01)
H04N 19/61 (2014.01)
H04N 19/86 (2014.01)
H04N 19/96 (2014.01)

(52) U.S. Cl.
CPC ......... *H04N 19/159* (2014.11); *H04N 19/176* (2014.11); *H04N 19/61* (2014.11); *H04N 19/86* (2014.11); *H04N 19/96* (2014.11)

(56) References Cited

U.S. PATENT DOCUMENTS

| | | | |
|---|---|---|---|
| 9,813,719 | B2 | 11/2017 | Wang |
| 10,057,574 | B2 | 8/2018 | Li et al. |
| 10,271,052 | B2 | 4/2019 | Zhang et al. |
| 10,277,909 | B2 | 4/2019 | Ye et al. |
| 10,382,766 | B2 | 8/2019 | Karczewicz et al. |
| 10,432,951 | B2 | 10/2019 | Wang |
| 10,506,230 | B2 | 12/2019 | Zhang et al. |
| 10,582,213 | B2 | 3/2020 | Li et al. |
| 10,694,202 | B2 | 6/2020 | Zhang et al. |
| 10,694,204 | B2 | 6/2020 | Chen et al. |
| 10,721,469 | B2 | 7/2020 | Zhang et al. |
| 10,764,576 | B2 | 9/2020 | Li et al. |
| 10,778,974 | B2 | 9/2020 | Karczewicz et al. |
| 10,855,985 | B2 | 12/2020 | Zhang et al. |
| 2007/0058713 | A1 | 3/2007 | Shen et al. |
| 2009/0116558 | A1 | 5/2009 | Chen et al. |
| 2012/0155540 | A1 | 6/2012 | Jagannathan |
| 2013/0107973 | A1 | 5/2013 | Wang et al. |
| 2014/0192904 | A1* | 7/2014 | Rosewarne ............ H04N 19/86 375/240.29 |
| 2015/0049821 | A1 | 2/2015 | Chen et al. |
| 2017/0238020 | A1 | 8/2017 | Karczewicz et al. |
| 2018/0041778 | A1 | 2/2018 | Zhang et al. |
| 2018/0103252 | A1* | 4/2018 | Hsieh ................... H04N 19/176 |
| 2018/0139444 | A1 | 5/2018 | Huang et al. |
| 2018/0234701 | A1 | 8/2018 | Zhang et al. |
| 2019/0238845 | A1 | 8/2019 | Zhang et al. |
| 2019/0306502 | A1 | 10/2019 | Gadde et al. |
| 2020/0177910 | A1 | 6/2020 | Li et al. |
| 2020/0267381 | A1 | 8/2020 | Vanam et al. |
| 2020/0322632 | A1 | 10/2020 | Hanhart et al. |
| 2020/0359016 | A1 | 11/2020 | Li et al. |
| 2020/0359017 | A1 | 11/2020 | Li et al. |
| 2020/0413038 | A1 | 12/2020 | Zhang et al. |

FOREIGN PATENT DOCUMENTS

| | | |
|---|---|---|
| CN | 107005718 A | 8/2017 |
| CN | 108028920 A | 5/2018 |
| WO | 2010017837 A1 | 2/2010 |
| WO | 2020167228 A | 8/2020 |

OTHER PUBLICATIONS

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Li et al. "Multi-Type-Tree." Joint Video Exploration Team (JVET), of ITU-T SG 16 WP 3 and ISO/IEC JTC 1/SC 29/WG 11, 4th Meeting: Chengdu, CN, Oct. 15-21, 2016, document JVET-D0117rl, 2016.
Luthra et al. Overview of the H.264/AVC Video Coding Standard, Proc. SPIE, 5203, Applications of Digital Image Processing, Nov. 19, 2003, Optical Science and Technology, SPIE 48th annutal Meeting, San Diego, CA, US, 2003.
Sullivan et al. "Overview of the High Efficiency Video Coding (HEVC) Standard," IEEE Transactions on Circuits and Systems for Video Technology, Dec. 2012, 22(12):1649-1668.
Wang et al. "Local-Constrained Quadtree Plus Binary Tree Block Partition Structure for Enhanced Video Coding," IEEXplore Visual Communication & Image Processing, Nov. 30, 2016.
Zhao et al. "CE6: Sub-Block Transform for Inter Blocks (CE6.4.1)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0140.
Zhao et al. "CE1-Related: Prediction Mode Restriction and Implicit Transform Splitting to Enable VPDU," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0285.
JEM-7.0: https://jvet.hhi.fraunhofer.de/svn/svn_HMJEMSoftware/tags/ HM-16.6-JEM-7.0.
https://www.itu.int/rec/T-REC-H.265.
International Search Report and Written Opinion from PCT/CN2020/077428 dated May 26, 2020 (10 pages).
International Search Report and Written Opinion from PCT/CN2020/077429 dated May 21, 2020 (10 pages).
Ugur et al. "Description of Video Coding Technology Proposal by Tandberg, Nokia, Ericsson," Joint Collaborative Team on Video Coding (JCT-VC) of ITU-T SG 16 WP3 and ISO/IEC JTC 1/SC 29/WG 11, 1st Meeting Dresden DE, Apr. 15-23, 2010, document JCTVC-A119, XP030009029, 2010.
Ugur et al. "Appendix to Description of Video Coding Technology Proposal by Tandberg Nokia Ericsson," Joint Collaborative Team on Video Coding (JCT-VC) of ITU-T SG 16 WP3 and ISO/IEC JTC 1/SC 29/WG 11, 1st Meeting Dresden DE, Apr. 15-23, 2010, document JCTVC-A119, XP-002714085, 2010.
Zhang et al. "Video Coding Using Spatially Varying Transform," IEEE Transactions on Circuits and Systems for Video Technology, Feb. 2011, 21(2):127-140. XP011348882.
Extended European Search Report from European Patent Application No. 20767163.7 dated Mar. 3, 2022 (14 pages).
Anderson et al. "CE11: Deblocking for 4×N, N×4 and 8×N and N×8 Block Boundaries That Not Are Aligned with 8×8 Grid (Test 11.2.1)," Joint Video Experts Team (JVET) of ITU-T SG 16 WP 3 and ISO/IEC JTC 1/SC 29/WG 11 13th Meeting, Marrakech, MA, Jan. 9-18, 2019, document JVET-M0299, 2019.
Zhao et al. "CE6: Sub-Block Transform for Inter Blocks (CE6.1.2)," Joint Video Experts Team (JVET) of ITU-T SG 16 WP 3 and ISO/IEC JTC 1/SC 29/WG 11,12th Meeting, Macao, CN, Oct. 3-12 28, document JVET-L0358. 2018.
Zhao et al. ""CE6: Spatially Varying Transform (Test 6.1.12.1), "" Joint Video Experts Team (JVET)of ITU-T SG 16 WP 3 and ISO/IEC JTC 1/SC 29/WG 1111th Meeting: Ljubljana, SI, Jul. 10-18, 2018, document JVET-K0139, 2018.

* cited by examiner

Subdivision of a CTB into CBs [and TBs]. Solid lines indicate CB boundaries and dotted lines indicate TB boundaries.

CTB with its partitioning

Illustration of a QTBT struc quad-tree partitioning vertical binary-tree partitioning horizontal binary-tree partitioning vertical center-side ternary-tree partitioning horizontal center-side ternary-tree partitioning

RESTRICTIONS ON IN-LOOP FILTERING

CROSS-REFERENCE TO RELATED APPLICATION

This application is a continuation of International Patent Application No. PCT/CN2020/077429, filed on Mar. 2, 2020, which claims the priority to and benefits of International Patent Application No. PCT/CN2019/076785, filed on Mar. 2, 2019. All the aforementioned patent applications are hereby incorporated by reference in their entireties.

TECHNICAL FIELD

This patent document relates to video coding techniques, devices, and systems.

BACKGROUND

Currently, efforts are underway to improve the performance of current video codec technologies to provide better compression ratios or provide video coding and decoding schemes that allow for lower complexity or parallelized implementations. Industry experts have recently proposed several new video coding tools and tests are currently underway for determining their effectivity.

SUMMARY

Devices, systems and methods related to digital video coding, and specifically, to deriving motion vectors are described. The described methods may be applied to existing video coding standards (e.g., High Efficiency Video Coding (HEVC) or Versatile Video Coding) and future video coding standards or video codecs.

In one representative aspect, the disclosed technology may be used to provide a method for video processing. This method includes determining, based at least in part on a virtual pipeline data unit (VPDU) size, whether a type of partition associated with a partition tree is allowed or disallowed or a video block, wherein the VPDU size includes a VPDU height and a VPDU width, wherein, in response to disallowing the type of partition, the indication of the partition type is not present in the bitstream.

In another representative aspect, the disclosed technology may be used to provide another method for video processing. This method includes determining, based at least in part on a maximally allowed sub-block transform size, whether a type of partition associated with a partition tree is allowed or disallowed for a video block, wherein the maximally allowed sub-block transform size includes a maximally allowed sub-block transform height and a maximally allowed sub-block transform width, wherein, in response to disallowing the type of partition, the indication of the partition type is not present in the bitstream.

In yet another representative aspect, the disclosed technology may be used to provide yet another method for video processing. This method includes determining, based at least in part on a maximally allowed transform size and a virtual pipeline data unit (VPDU) size, or based at least in part on a maximally allowed sub-block transform size and a virtual pipeline data unit (VPDU) size, whether a type of partition associated with a partition tree is allowed or disallowed for a video block, wherein the VPDU size includes a VPDU height and a VPDU width, wherein the maximally allowed transform size includes a maximally allowed transform height and a maximally allowed transform width, wherein, in response to disallowing the type of partition, the indication of the partition type is not present in the bitstream.

In yet another representative aspect, the disclosed technology may be used to provide yet another method for video processing. This method includes: determining whether a sample is located at sub-block transform boundaries in case that a sub-block transform is applied; applying deblocking filter process if it is determined that the sample is located at sub-block transform boundaries; and performing a conversion between the video and a bitstream representation of the video.

In still another representative aspect, the disclosed technology may be used to provide yet another method for video processing. This method includes determining how to apply filtering process for a video block based on whether a sub-block transform is applied; performing the filtering process based on the determining; and performing a conversion between the video block and a bitstream representation of the video.

Further, in a representative aspect, a video decoding apparatus is disclosed, comprising a processor configured to implement any one or more of the disclosed methods.

Further, in a representative aspect, a video encoding apparatus is disclosed, comprising a processor configured to implement any one or more of the disclosed methods.

Further, in a representative aspect, an apparatus in a video system comprising a processor and a non-transitory memory with instructions thereon is disclosed. The instructions upon execution by the processor, cause the processor to implement any one or more of the disclosed methods.

Also, a computer program product stored on a non-transitory computer readable media, the computer program product including program code for carrying out any one or more of the disclosed methods is disclosed.

The above and other aspects and features of the disclosed technology are described in greater detail in the drawings, the description and the claims.

DETAILED DESCRIPTION

1. Video Coding in H.264/AVC

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 4) could be found at: http://phenix.it-sudparis.eu/jvet/doc_end_user/current_document.php?id=5755.
The latest reference software of VVC, named VTM, could be found at: https://vcgit.hhi.fraunhofer.de/jvet/VVCSoftware_VTM/tags/VTM-3.1

2.1. Partition Tree Structure in H.264/AVC

The terminology used in H.264/AVS is macroblock and MB-mode/8×8-mode (partition). Macroblock is the unit wherein each picture/slice is split up and where intra/inter mode decision is applied. Partition defines the level wherein motion information is signaled.

The coding layer in H.264/AVC relied on the macroblock, which included a 16×16 block of luma samples and, in the usual case of 4:2:0 color sampling, two corresponding 8×8 blocks of chroma samples.

2.1.1. H.264/AVC Main Profile

In this profile, an intra-coded block uses spatial prediction to exploit spatial correlation among pixels. Two partitions are defined: 16×16 and 4×4.

Figure 1:
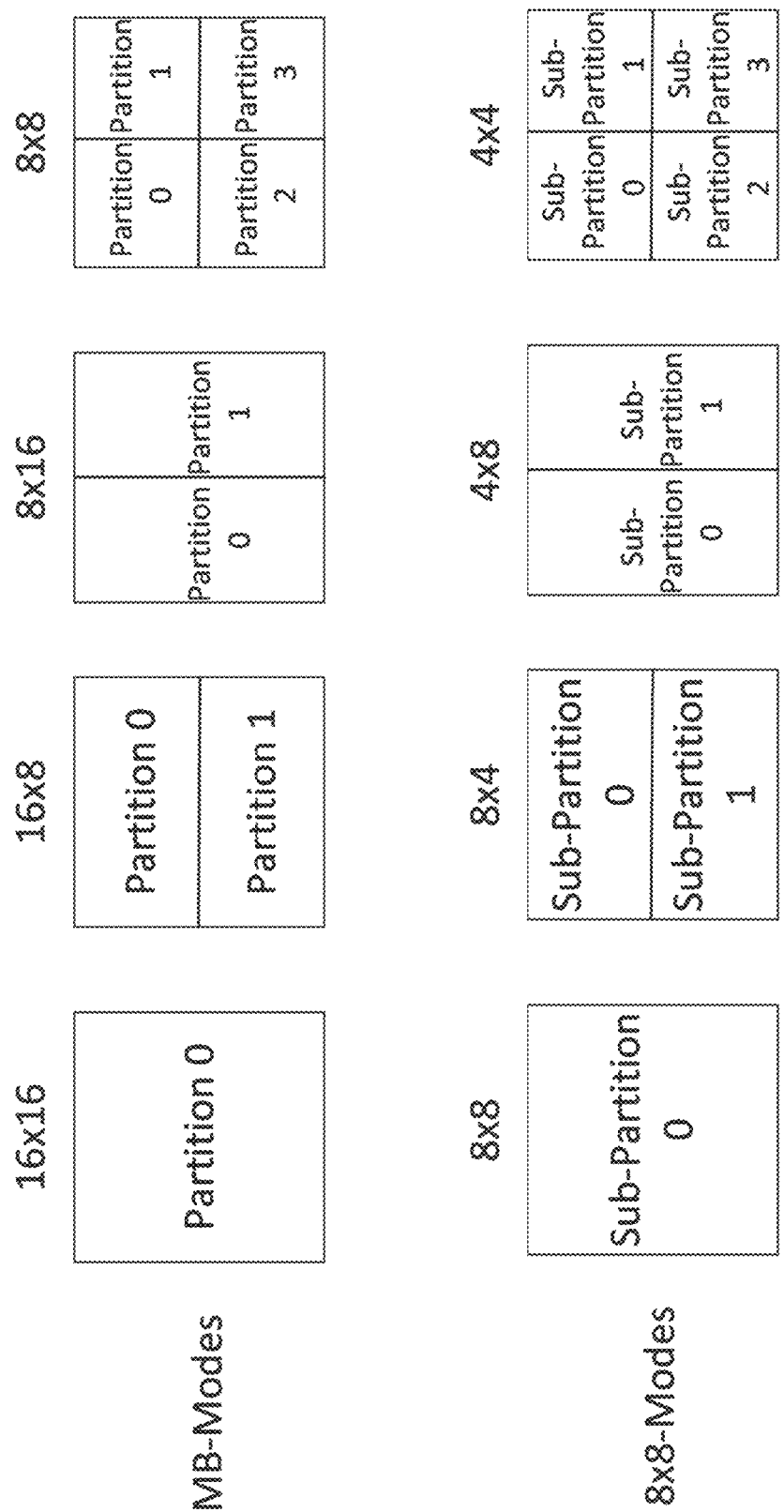
FIG. 1 shows examples of macroblock partitions.

An inter-coded block uses temporal prediction, instead of spatial prediction, by estimating motion among pictures. Motion can be estimated independently for either 16×16 macroblock or any of its macroblock partitions: 16×8, 8×16, 8×8. A syntax element (MB-mode) is signaled to indicate whether 16×16, 16×8, 8×16 or 8×8 is chosen. If 8×8 is selected, another syntax element (8×8 mode) is further signaled to indicate whether 8×8, 8×4, 4×8, 4×4 (e.g., as shown in FIG. 1) is used. Only one motion vector (MV) per partition is allowed.

Only 4×4 transform is utilized.

2.1.2. H.264/AVC High Profile

In the high profile, 8×8 transform and I_8×8 (8×8 intra prediction) is introduced. For intra-coded macroblock, the transform size is fixed. I_16×16 and I_4×4 use 4×4 transform; I_8×8 uses 8×8 transform.

For inter-coded macroblocks, either 4×4 or 8×8 transform can be selected. However, the transform size cannot exceed the partition size. For example, if one macroblock chooses 8×8 partition and also selects 8×4 sub-mode, only 4×4 transform may be applied. If one macroblock chooses 16×16, 16×8, 8×16 8×8 partition with 8×8 sub-mode, then either 4×4 or 8×8 transform can be selected.

2.1.3. Summary

Mode selection is decided in macroblock-level. Transform size shall be no larger than the partition sizes.

2.2. Partition Tree Structure in HEVC

In HEVC, a coding tree unit (CTU), a/k/a largest coding unit, LCU) is split into coding units (CUs) by using a quadtree structure denoted as coding tree to adapt to various local characteristics. The decision whether to code a picture area using inter-picture (temporal) or intrapicture (spatial) prediction is made at the CU level. Each CU can be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of the key features of the HEVC structure is that it has the multiple partition conceptions including CU, PU, and TU.

In the following, the various features involved in hybrid video coding using HEVC are highlighted as follows.

1) Coding tree units and coding tree block (CTB) structure: The analogous structure in HEVC is the coding tree unit (CTU), which has a size selected by the encoder and can be larger than a traditional macroblock. The CTU includes a luma CTB and the corresponding chroma CTBs and syntax elements. The size L×L of a luma CTB can be chosen as L=16, 32, or 64 samples, with the larger sizes typically enabling better compression. HEVC then supports a partitioning of the CTBs into smaller blocks using a tree structure and quadtree-like signaling.

2) Coding units (CUs) and coding blocks (CBs): The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs is signaled jointly. One luma CB and ordinarily two chroma CBs, together with associated syntax, form a coding unit (CU). A CTB may include only one CU or may be split to form multiple CUs, and each CU has an associated partitioning into prediction units (PUs) and a tree of transform units (TUs).

Figure 2:
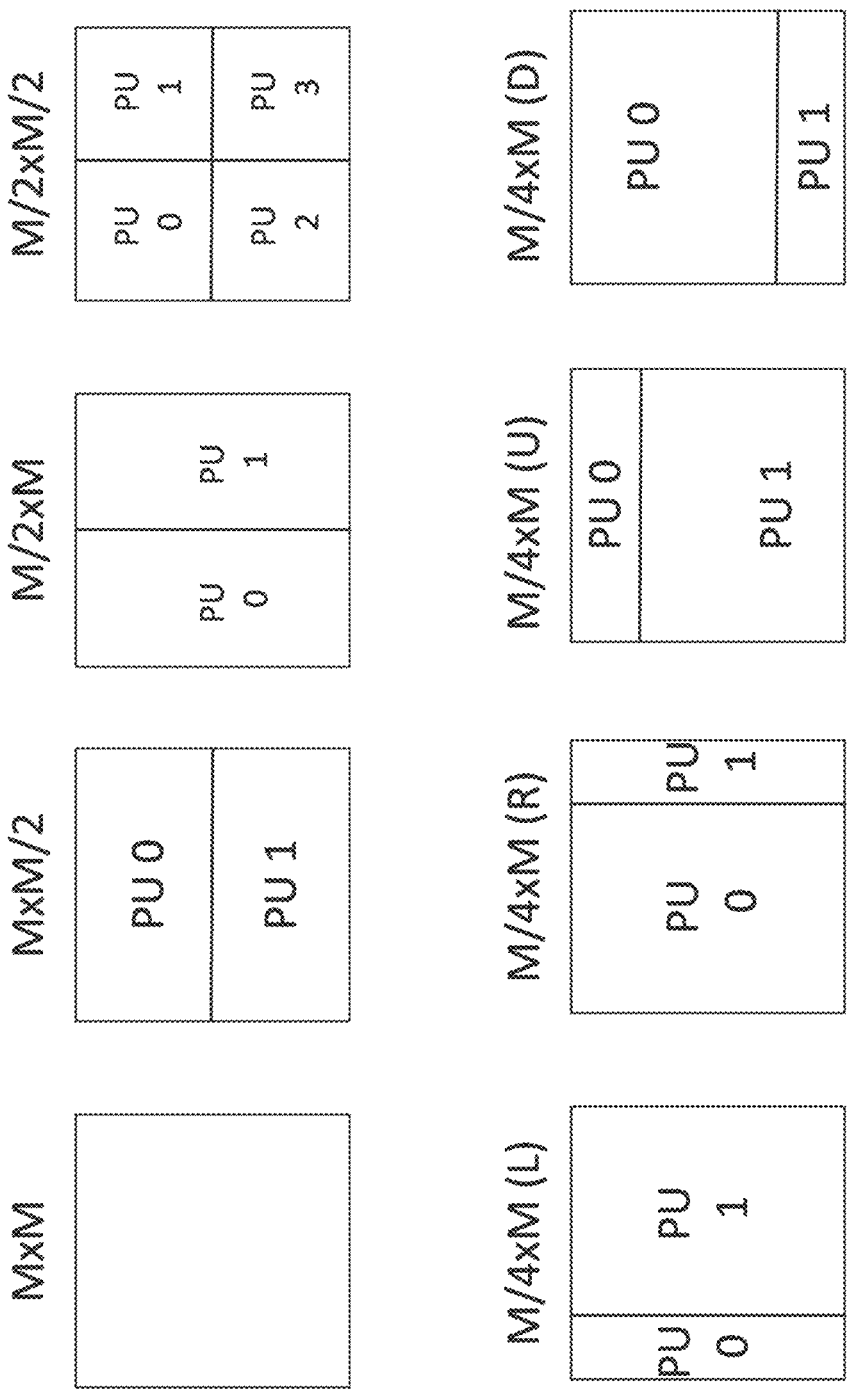
FIG. 2 shows examples of modes for splitting coding blocks (CB) into prediction blocks (PB).

3) Prediction units (PUs) and prediction blocks (PBs): The decision whether to code a picture area using inter picture or intra picture prediction is made at the CU level. A PU partitioning structure has its root at the CU level. Depending on the basic prediction-type decision, the luma and chroma CB s can then be further split in size and predicted from luma and chroma prediction blocks (PBs). HEVC supports variable PB sizes from 64×64 down to 4×4 samples. FIG. 2 depicts the allowed PB s.

4) Transform units (TUs) and transform blocks (TBs): The prediction residual is coded using block transforms. A TU tree structure has its root at the CU level. The luma CB residual may be identical to the luma transform block (TB) or may be further split into smaller luma TBs. The same applies to the chroma TBs. Integer basis functions similar to those of a discrete cosine transform (DCT) are defined for the square TB sizes 4×4, 8×8, 16×16, and 32×32. For the 4×4 transform of luma intra picture prediction residuals, an integer transform derived from a form of discrete sine transform (DST) is alternatively specified.

2.2.1. Depth of Quadtree

For a given luma CB of size M×M, a flag signals whether it is split into four blocks of size M/2×M/2. If further splitting is possible, as signaled by a maximum depth of the residual quadtree indicated in the SPS, each quadrant is assigned a flag that indicates whether it is split into four quadrants. The leaf node blocks resulting from the residual quadtree are the transform blocks that are further processed by transform coding. The encoder indicates the maximum and minimum luma TB sizes that it can use. Splitting is implicit when the CB size is larger than the maximum TB size. Not splitting is implicit when splitting would result in a luma TB size smaller than the indicated minimum. The chroma TB size is half the luma TB size in each dimension, except when the luma TB size is 4×4, in which case a single 4×4 chroma TB is used for the region covered by four 4×4 luma TBs. In the case of intrapicture-predicted CUs, the decoded samples of the nearest-neighboring TBs (within or outside the CB) are used as reference data for intrapicture prediction.

2.2.2. Summary

Figures 3A, 3B:
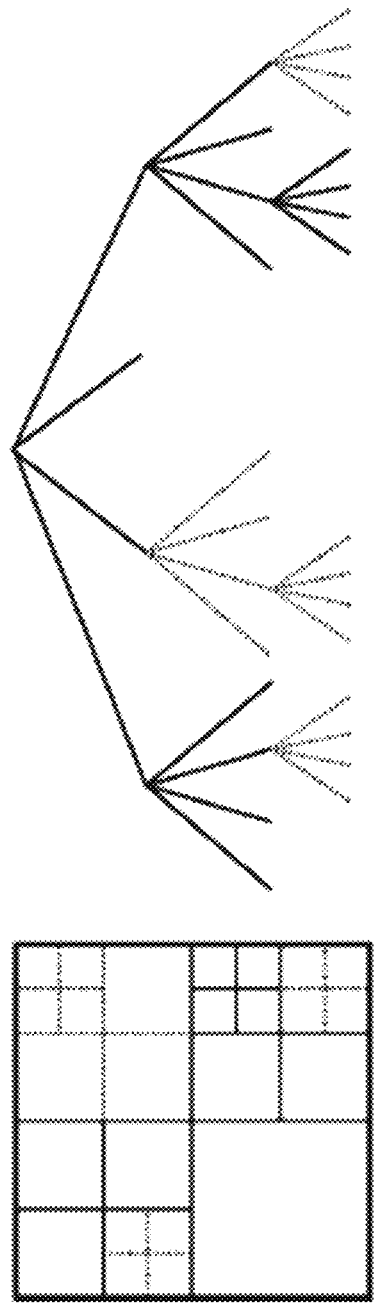
FIG. 3A show an example of a coding tree block (CTB) with its partitioning.
FIG. 3B show an example of a quadtree corresponding to the CTB in FIG. 3A.

One CTU may be recursively split into multiple CUs based on increased depth of quadtree. Only square CB and TB partitioning is specified, where a block can be recursively split into quadrants, as illustrated in FIGS. 3A and 3B.

Mode selection is decided in CU-level. Side information according to a selected mode is signaled in PU-level, such as motion information, intra prediction modes. Residual are signaled in TU-level.

One PU can be no larger than CU for inter-coded blocks and one PU is equal to CU for intra-coded blocks.

TU could exceed PU for inter-coded blocks but is equal to PU for intra-coded blocks.

2.3. Quadtree Plus Binary Tree Block Structure with Larger CTUs in JEM

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

2.3.1. Quadtree Plus Binary Tree (QTBT) Block Partitioning Structure

Different from HEVC, the QTBT block structure removes the concepts of multiple partition types, i.e., it removes the separation of the CU, PU and TU concepts, and supports more flexibility for CU partition shapes. In the QTBT block structure, a CU can have either a square or rectangular shape. As shown in FIGS. 5A-5E, a coding tree unit (CTU) is first partitioned by a quadtree structure. The quadtree leaf nodes are further partitioned by a binary tree structure. There can be two types of splitting: symmetric horizontal splitting and symmetric vertical splitting, in the binary tree splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes includes coding blocks (CBs) of different colour components, e.g., one CU includes one luma CB and two chroma CBs in the case of P and B slices of the 4:2:0 chroma format and sometimes includes a CB of a single component, e.g., one CU includes only one luma CB or only two chroma CBs in the case of I slices.

The following parameters are defined for the QTBT partitioning scheme.

CTU size: the root node size of a quadtree (e.g., the same concept as in HEVC)
    MinQTSize: the minimum allowed quadtree leaf node size
    MaxBTSize: the maximum allowed binary tree root node size
    MaxBTDepth: the maximum allowed binary tree depth
    MinBTSize: the minimum allowed binary tree leaf node size In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the leaf quadtree node is 128×128, it cannot be further split by the binary tree since the size exceeds the MaxBTSize (i.e., 64×64). Otherwise, the leaf quadtree node can be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 4A:
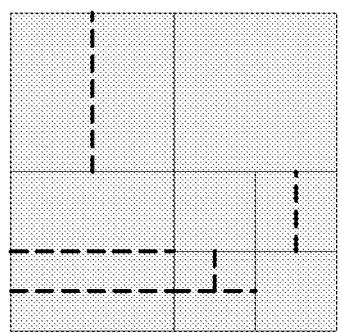
FIGS. 4A and 4B show illustrations in connection with a quadtree plus binary tree (QTBT) block structure.
Figure 4B:
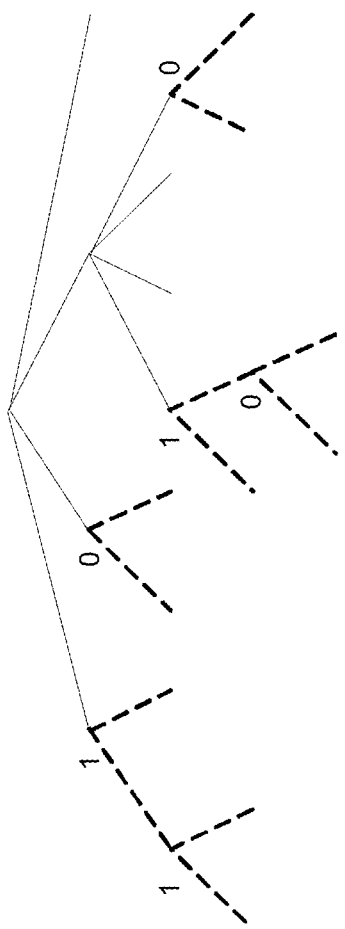

FIG. 4A illustrates an example of block partitioning using QTBT, and FIG. 4B illustrates the corresponding tree representation. The solid lines indicate quadtree splitting and dotted lines indicate binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For the quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice includes a coding block of the luma component or coding blocks of two chroma components, and a CU in a P or B slice includes coding blocks of all three colour components.

In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the JEM, these restrictions are removed.

2.3.2. Summary of QTBT

One CTU may be recursively split into multiple CUs based on increased depth of quadtree or binary tree. Square and rectangular CB (with width/height equal to ½ or 2) are specified.

Mode selection is decided in CU-level. PU and TU are always equal to CU.

2.4. Multiple Type Trees (MTT) for VVC 2.4.1. Proposal

Figure 5A:
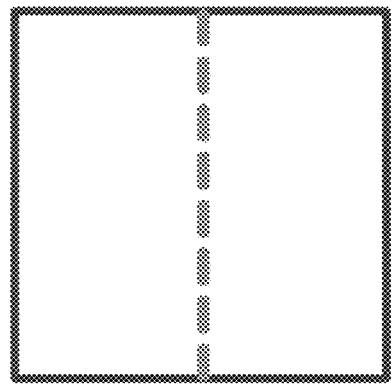
FIGS. 5A-5E show examples of types of partitioning.
Figure 5B:
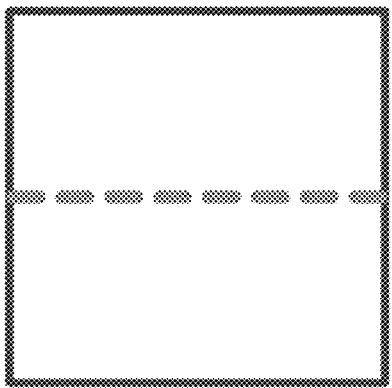
Figure 5C:
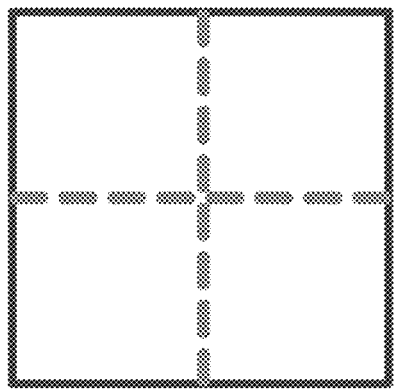
Figure 5D:
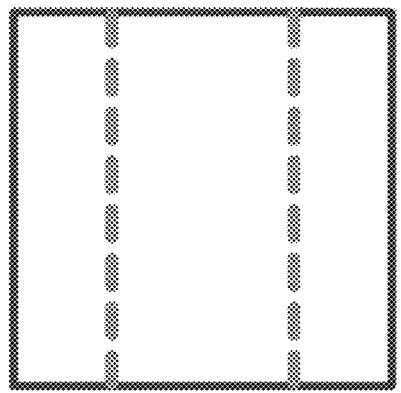
Figure 5E:
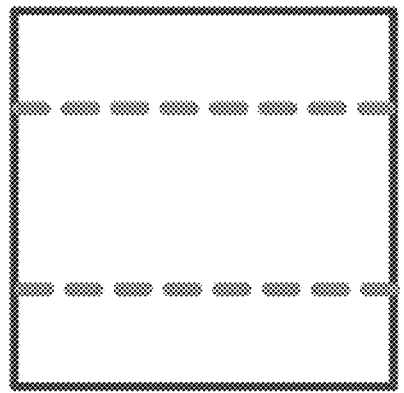

As proposed, tree types other than quad-tree and binary-tree are supported. In the implementation, two more ternary tree (TT) partitions, i.e., horizontal and vertical center-side triple-trees are introduced, as shown in FIGS. 5D and 5E.

There are two levels of trees, region tree (quad-tree) and prediction tree (binary-tree or triple-tree). A CTU is firstly partitioned by region tree (RT). A RT leaf may be further split with prediction tree (PT). A PT leaf may also be further split with PT until max PT depth is reached. A PT leaf is the basic coding unit. It is still called CU for convenience. A CU cannot be further split. Prediction and transform are both applied on CU in the same way as JEM. The whole partition structure is named "multiple-type-tree."

2.4.2. Partition tree in VVC

Several syntax elements are defined/signaled in VVC to indication the usage of different partition trees.

For example:
a maximum multi-type tree depth with offset maxMttDepth,
a maximum binary tree size maxBtSize
MinBtSizeY
maximum binary tree size maxBtSize
maximum ternary tree size maxTtSize 2.4.2.1. Restrictions of usage of BT and TT 2.4.2.1.1 Variable definitions log2_ctu_size_minus2, log2_min_luma_coding_block_size_minus2 can be signaled in SPS.

log2_ctu_size_minus2 plus 2 specifies the luma coding tree block size of each CTU.

log2_min_luma_coding_block_size_minus2 plus 2 specifies the minimum luma coding block size.

The variables CtbLog2SizeY, CtbSizeY, MinCbLog2SizeY, MinCbSizeY, MinTbLog2SizeY, MaxTbLog2SizeY, MinTbSizeY, MaxTbSizeY, PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

CtbLog2SizeY=log2_ctu_size_minus2+2

CtbSizeY=1<<CtbLog2SizeY

MinCbLog2SizeY=log2_min_luma_coding_block_size_minus2+2

MinCbSizeY=1<<MinCbLog2SizeY

MinTbLog2SizeY=2

MaxTbLog2SizeY=6

MinTbSizeY=1<<MinTbLog2SizeY

MaxTbSizeY=1<<MaxTbLog2SizeY

PicWidthInCtbsY=Ceil(pic_width_in_luma_samples÷CtbSizeY)

PicHeightInCtbsY=Ceil(pic_height_in_luma_samples÷CtbSizeY)

PicSizeInCtbsY=PicWidthInCtbsY*PicHeightInCtbsY

PicWidthInMinCbsY=pic_width_in_luma_samples/MinCbSizeY

PicHeightInMinCbsY=pic_height_in_luma_samples/MinCbSizeY

PicSizeInMinCbsY=PicWidthInMinCbsY*PicHeightInMinCbsY

PicSizeInSamplesY=pic_width_in_luma_samples*pic_height_in_luma_samples

PicWidthInSamplesC=pic_width_in_luma_samples/SubWidthC

PicHeightInSamplesC=pic_height_in_luma_samples/SubHeightC 2.4.2.1.2 Allowed binary split process Inputs to this process are:
a binary split mode btSplit,
a coding block width cbWidth,
a coding block height cbHeight,
a location (x0, y0) of the top-left luma sample of the considered coding block relative to the top-left luma sample of the picture,
a multi-type tree depth mttDepth,
a maximum multi-type tree depth with offset maxMttDepth,
a maximum binary tree size maxBtSize,
a partition index partIdx.

Output of this process is the variable allowBtSplit.

TABLE 1

Specification of parallelTtSplit and cbSize based on btSplit.

|  | btSplit = = SPLIT_BT_VER | btSplit = = SPLIT_BT_HOR |
| --- | --- | --- |
| parallelTtSplit | SPLIT_TT_VER | SPLIT_TT_HOR |
| cbSize | cbWidth | cbHeight |

The variables parallelTtSplit and cbSize are derived as specified in Table 1.

For different embodiments, the variable allowBtSplit (e.g., a splitting variable that takes a Boolean true or false value) can be based according to, or on different conditions. Using these conditions, the value of this variable can be derived as follows:

If one or more of the following conditions are true, allowBtSplit is set equal to FALSE:
  //according to allowed BT block size and maximum allowed MTT depth conditions
  cbSize is less than or equal to MinBtSizeY
  cbWidth is greater than maxBtSize
  cbHeight is greater than maxBtSize
  mttDepth is greater than or equal to maxMttDepth
Otherwise, if all of the following conditions are true, allowBtSplit is set equal to FALSE
  //according to picture boundary (no vertical BT for bottom picture boundary and bottom-right picture boundary) conditions
  btSplit is equal to SPLIT_BT_VER
  y0+cbHeight is greater than pic_height_in_luma_samples
Otherwise, if all of the following conditions are true, allowBtSplit is set equal to FALSE
  //according to picture boundary (no horizontal BT for bottom-right picture boundary) conditions
  btSplit is equal to SPLIT_BT_HOR
  x0+cbWidth is greater than pic_width_in_luma_samples
  y0+cbHeight is less than or equal to pic_height_in_luma_samples
Otherwise, if all of the following conditions are true, allowBtSplit is set equal to FALSE:
  //decide the TT partition index 1 (middle partition) according to parent TT split direction (e.g., for vertical TT, no vertical BT for the middle partition; for horizontal TT, no horizontal BT for the middle partition) conditions
    mttDepth is greater than 0
    partIdx is equal to 1
    MttSplitMode[x0][y0][mttDepth−1] is equal to parallelTtSplit Otherwise if all of the following conditions are true, allowBtSplit is set equal to FALSE
    //according to maximumly allowed transform sizes (e.g., when MaxTbSizeY is equal to 64, for 64×128, no vertical BT; for 128×64, no horizontal BT) conditions
    btSplit is equal to SPLIT_BT_VER
    cbWidth is less than or equal to MaxTbSizeY
    cbHeight is greater than MaxTbSizeY Otherwise if all of the following conditions are true, allowBtSplit is set equal to FALSE
    btSplit is equal to SPLIT_BT_HOR
    cbWidth is greater than MaxTbSizeY
    cbHeight is less than or equal to MaxTbSizeY Otherwise, allowBtSplit is set equal to TRUE.

2.4.2.1.3 Allowed ternary split process

Inputs to this process are:
a ternary split mode ttSplit,
a coding block width cbWidth,
a coding block height cbHeight,
a location (x0, y0) of the top-left luma sample of the considered coding block relative to the top-left luma sample of the picture,
a multi-type tree depth mttDepth
a maximum multi-type tree depth with offset maxMttDepth,
a maximum binary tree size maxTtSize.

Output of this process is the splitting variable allowTtSplit (e.g., which takes a Boolean true or false value). The value of the splitting variable allowTtSplit can be based according to, or on different conditions. Using these conditions, the value of this variable can be derived as follows:

TABLE 2

Specification of cbSize based on ttSplit.

| | ttSplit == SPLIT_TT_VER | ttSplit == SPLIT_TT_HOR |
|---|---|---|
| cbSize | cbWidth | cbHeight |

The variable cbSize is derived as specified in Table 2.
The variable allowTtSplit is derived as follows:
If one or more of the following conditions are true, allowTtSplit is set equal to FALSE:
    //according to allowed TT block size and maximumly allowed transform size conditions
    cbSize is less than or equal to 2*MinTtSizeY
    cbWidth is greater than Min(MaxTbSizeY, maxTtSize)
    cbHeight is greater than Min(MaxTbSizeY, maxTtSize)
    //according to maximum allowed MTT depth condition
    mttDepth is greater than or equal to maxMttDepth
    //according to whether it is located at picture boundary condition
    x0+cbWidth is greater than pic_width_in_luma_samples
    y0+cbHeight is greater than pic_height_in_luma_samples Otherwise, allowTtSplit is set equal to TRUE.

2.4.2.1.4 Semantics

VVC Specification Sub-Clause 7.4.5.5 Multi-Type Tree Semantics

The variables allowSplitBtVer, allowSplitBtHor, allowSplitTtVer allowSplitTtHor are derived as follows:
The variables maxBtSize, maxTtSize and maxMttDepth are derived as follows:
    If treeType is equal to DUAL_TREE_CHROMA, maxBtSize, maxTtSize and maxMttDepth are set equal to MaxBtSizeC, MaxTtSizeC and MaxMttDepthC+depthOffset, respectively.
    Otherwise, maxBtSize, maxTtSize and maxMttDepth are set equal to MaxBtSizeY, MaxTtSizeY and MaxMttDepthY+depthOffset, respectively.

The allowed binary split process as specified in clause 2.4.2.1.1 is invoked with the binary split mode SPLIT_BT_VER, the coding block width cbWidth, the coding block height cbHeight, the location (x0, y0), the current multi-type tree depth mttDepth, the maximum multi-type tree depth with offset maxMttDepth, the maximum binary tree size maxBtSize, and the current partition index partIdx as inputs, and the output is assigned to allowSplitBtVer.

The allowed binary split process as specified in clause 2.4.2.1.1 is invoked with the binary split mode SPLIT_BT_HOR, the coding block height cbHeight, the coding block width cbWidth, the location (x0, y0), the current multi-type tree depth mttDepth, the maximum multi-type tree depth with offset maxMttDepth, the maximum binary tree size maxBtSize, and the current partition index partIdx as inputs, and the output is assigned to allowSplitBtHor.

The allowed ternary split process as specified in clause 2.4.2.1.3 is invoked with the ternary split mode SPLIT_TT_VER, the coding block width cbWidth, the coding block height cbHeight, the location (x0, y0), the current multi-type tree depth mttDepth, the maximum multi-type tree depth with offset maxMttDepth, and the maximum ternary tree size maxTtSize as inputs, and the output is assigned to allowSplitTtVer.

The allowed ternary split process as specified in clause 2.4.2.1.3 is invoked with the ternary split mode SPLIT_TT_HOR, the coding block height cbHeight, the coding block width cbWidth, the location (x0, y0), the current multi-type tree depth mttDepth, the maximum multi-type tree depth with offset maxMttDepth, and the maximum ternary tree size maxTtSize as inputs, and the output is assigned to allowSplitTtHor.

2.4.3. Sub-Block Transform

For an inter-predicted CU with cu_cbf equal to 1, cu_sbt_flag may be signaled to indicate whether the whole residual block or a sub-part of the residual block is decoded. In the former case, inter multiple transform selection (MTS, a.k.a, EMT) information is further parsed to determine the transform type of the CU. In the latter case, a part of the residual block is coded with inferred adaptive transform and the other part of the residual block is zeroed out.

2.4.3.1. Sub-Block TU Tiling

Figure 6:
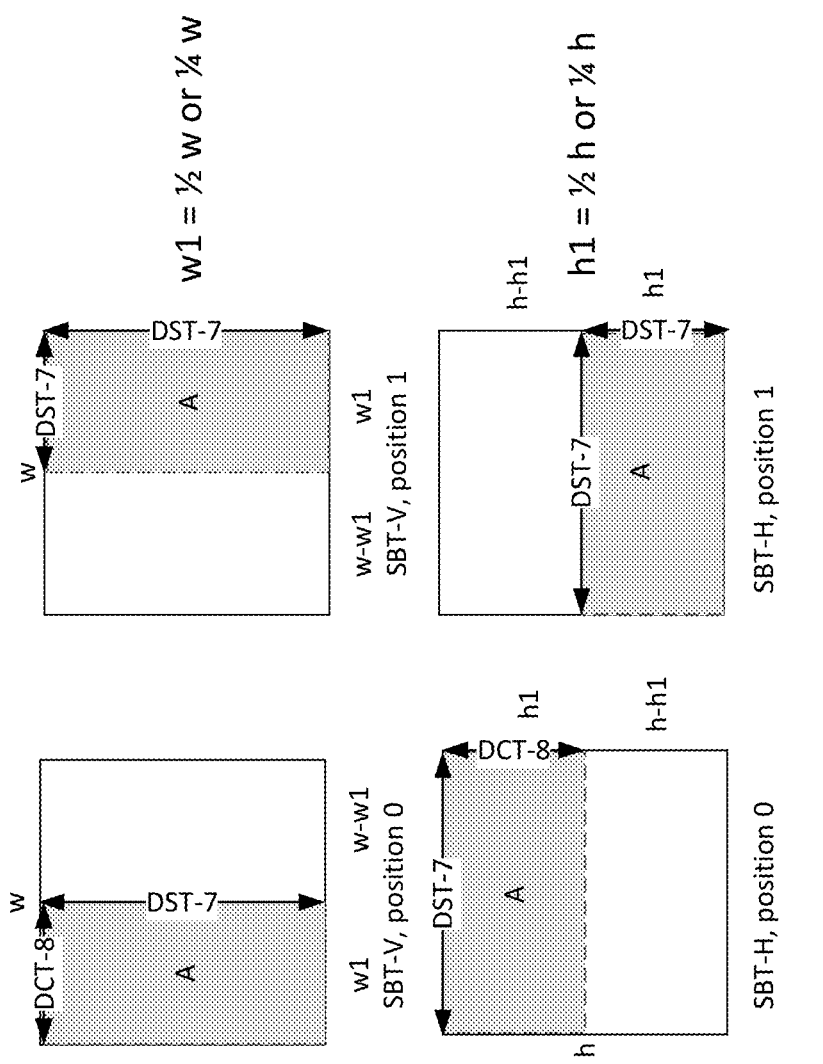
FIG. 6 shows an examples of sub-block transform modes.

When SBT is used for a inter CU, SBT type and SBT position information are further decoded from the bitstream. There are two SBT types and two SBT positions, as indicated in FIG. 6. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

SBT-V and SBT-H are allowed for CU with width and height both no larger than maxSbtSize. The maxSbtSize is signaled in SPS. For HD and 4K sequences, maxSbtSize is set as 64 by encoder; for other smaller resolution sequences, maxSbtSize is set as 32.

2.5. Transform Type of the Sub-Block

In JVET-M0140, position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 1. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

Summary of adopted parts from SBT for inter blocks:
1-d split (symmetric or ¼)
if symmetric, signal which half; others use the ¼
transform type of residual TU inferred

3. Problems

The current design of partition tree restrictions is based on the assumption of whole-block transform and common test conditions. It may have the following problems:
  i. Whether to enable or disable splitting according to one partition structure is dependent on the maximally allowed transform size. The motivation to enable/disable one partition structure is mainly due to the consideration of hardware implementation that larger blocks (such as 128×128) are hard to be implemented. In versatile video coding (VVC), the concept of VPDU (virtual pipeline data unit) is employed wherein the maximumly allowed block for motion compensation is defined. In current common test conditions, the VPDU size is equal to the maximally allowed transform size. However, the maximally allowed transform size is adaptively signaled in high level syntax elements, such as sequence parameters.
  ii. Assuming the maximum allowed transform size is 64×64, if one coding block is 64×128, vertical BT is disallowed. However, due to the adoption of sub-block transform, vertical BT may be still applied with the sub-block transform size set 32×64.
  iii. How to handle the boundary of blocks coded with sub-block transforms hasn't been addresses in the art.

4. Example Techniques and Embodiments

The detailed embodiments described below should be considered as examples to explain general concepts. These embodiments should not be interpreted narrowly way. Furthermore, these embodiments can be combined in any manner.

1. Instead of using the maximally allowed transform size, it is proposed that whether one partition tree is allowed or not may depend on the VPDU size.
   a. In one example, vertical BT is disallowed if the block width is no larger than the VPDU width and block height is greater than the VPDU height
   b. In one example, horizontal BT is disallowed if the block width is greater than the VPDU width and block height is no larger than the VPDU height.
   c. Similarly, for the TT split, it may be disallowed if one (or some \or all) of the following conditions are true:
      cbSize is less than or equal to 2*MinTtSizeY
      cbWidth is greater than Min (VPDUSizeX, maxTtSize)
      cbHeight is greater than Min (VPDUSizeY, maxTtSize)
      wherein MinTtSizeY and maxTtSize indicate the minimum and maximumly allowed TT size, respectively; cbWidth and cbHeight represent the coding block's width and height, respectively, VPDUSizeX and VPDUSizeY represent the VPDU width and height, respectively.
   d. In one example, VPDU height is equal to VPDU width.
      i. In one example, only one of VPDU height and width is signaled from the encoder to the decoder. The other one is set equal to the signaled one.
      ii. In an alternative example, VPDU height may be not equal to VPDU width.
         a) In one example, both VPDU height and width are signaled from the encoder to the decoder.
2. Instead of using the maximally allowed transform size, it is proposed that whether one partition tree is allowed or not may depend on maximally allowed sub-block transform size for a partition tree.
   a. In one example, vertical BT may be allowed even if the block width is no larger than maximally allowed transform width and block height is greater than the maximally allowed transform height.
      i. Alternatively, furthermore, sub-block transform may be applied for the above case, that is, transform is applied to part of the child block due to vertical BT.
      ii. In one example, vertical BT may be allowed if the block width is no larger than maximally allowed transform width and block height is greater than the maximally allowed transform height but the sub-block due to the vertical BT splitting supports at least one sub-block transform size.
      iii. In one example, vertical BT may be allowed if the block width is no larger than maximally allowed transform width and block height is greater than the maximally allowed transform height but the block height is no larger than the maximally allowed sub-block transform height.
      iv. Alternatively, furthermore, vertical BT may be disallowed the block width is no larger than maximally allowed sub-block transform width and block height is greater than the maximally allowed sub-block transform height.
         a) In one example, the specific maximally allowed sub-block transform width/height is for the vertical BT (V-BT).
      v. In one example, the maximally allowed sub-block transform width for the V-BT may be defined to be half or quarter of maximally allowed transform width maximally allowed transform width.
      vi. In one example, the maximally allowed sub-block transform height for the V-BT may be defined to be half or quarter of maximally allowed transform height or larger than maximally allowed transform height.
b. In one example, horizontal BT may be allowed even if the block width is greater than maximally allowed transform width and block height is no larger than the maximally allowed transform height.
   i. Alternatively, furthermore, sub-block transform may be applied for the above case, that is, transform is applied to part of the child block due to vertical BT.
   ii. Alternatively, furthermore, horizontal BT is disallowed if the block width is greater than the maximally allowed sub-block transform width and block height is no larger than the maximally allowed sub-block transform height.
      a) In one example, the specific maximally allowed sub-block transform width/height is for the horizontal BT (H-BT).
   iii. In one example, the maximally allowed sub-block transform width for the V-BT may be defined to be half or quarter of maximally allowed transform width maximally allowed transform width.
   iv. In one example, the maximally allowed sub-block transform height for the V-BT may be defined to be half or quarter of maximally allowed transform height maximally allowed transform height.
c. In one example, set Tx=maximum {maximally allowed transform width, maximally allowed sub-block width}, Ty=maximum {maximally allowed transform height, maximally allowed sub-block height}, then it is proposed that whether a split is allowed may depend on Tx and/or Ty.
   i. In one example, vertical BT may be disallowed the block width is no larger than Tx and block height is greater than Ty.
   ii. horizontal BT is disallowed if the block width is greater than Tx and block height is no larger than Ty.
d. Alternatively, furthermore, such methods may be applied when the sub-block transform technology is enabled, such as the SPS flag is true.
3. Whether one partition tree is allowed or not may depend on both of the VPDU size and maximally allowed transform sizes.
a. Alternatively, whether one partition tree is allowed or not may depend on both of the VPDU size and maximally allowed sub-block transform sizes
b. In one example, vertical BT is disallowed if the block width is no larger than the f(VPDU width, maximally allowed transform width) and block height is greater than the f(VPDU height, maximally allowed transform height)
c. In one example, horizontal BT is disallowed if the block width is greater than the f(VPDU width, maximally allowed transform width) and block height is no larger than f(VPDU height, maximally allowed transform height)
d. In one example, the function f(x, y) returns the larger value of x and y.
e. In one example, the function f(x, y) returns the smaller value of x and y.
f. In one example, VPDU height is equal to VPDU width.
g. In one example, maximally allowed transform width is equal to maximally allowed transform height.

4. The VPDU size (including width and height) mentioned above may be pre-defined, e.g., 64×64.
   a. Alternatively, it may be signaled in SPS/VPS/PPS/sequence header/picture header/tile group header/slice header/CTU row/regions/other kinds of video processing data units.
5. It is proposed that how to apply filtering process, such as deblocking filter, SAO and/or ALF may depend on the sub-block transform size.
   a. In one example, the boundary of sub-block transform may be filtered in the deblocking filter process.
   b. In one example, the decision of deblocking filter (such as filtering or not, strong or weak filter or which filter or how to apply clipping to filtered samples) may depend on whether samples is located at the sub-block transform boundaries.

5. Additional Example Embodiments 5.1.1.1.1 Allowed Binary Split Process
   Inputs to this process are:
   a binary split mode btSplit,
   a coding block width cbWidth,
   a coding block height cbHeight,
   a location (x0, y0) of the top-left luma sample of the considered coding block relative to the top-left luma sample of the picture,
   a multi-type tree depth mttDepth,
   a maximum multi-type tree depth with offset maxMttDepth,
   a maximum binary tree size maxBtSize,
   a partition index partIdx.
   Output of this process is the variable allowBtSplit (e.g., a Boolean variable that takes the values true or false).
   Otherwise if all of the following conditions are true, allowBtSplit is set equal to FALSE:
   btSplit is equal to SPLIT_BT_VER
   cbWidth is less than or equal to VPDUSizeY
   cbHeight is greater than VPDUSizeY
   Otherwise if all of the following conditions are true, allowBtSplit is set equal to FALSE
   btSplit is equal to SPLIT_BT_HOR
   cbWidth is greater than VPDUSizeY
   cbHeight is less than or equal to VPDUSizeY 5.1.1.1.2 Allowed Ternary Split Process
   Inputs to this process are:
   a ternary split mode ttSplit,
   a coding block width cbWidth,
   a coding block height cbHeight,
   a location (x0, y0) of the top-left luma sample of the considered coding block relative to the top-left luma sample of the picture,
   a multi-type tree depth mttDepth
   a maximum multi-type tree depth with offset maxMttDepth,
   a maximum binary tree size maxTtSize.
   Output of this process is the variable allowTtSplit.

TABLE 3

Specification of cbSize based on ttSplit.

| | ttSplit == SPLIT_TT_VER | ttSplit == SPLIT_TT_HOR |
|---|---|---|
| cbSize | cbWidth | cbHeight |

The variable cbSize can be derived based on the information specified in Table 3.

The variable allowTtSplit can be derived, based on or according to various conditions as follows:

If one or more of the following conditions are true, allowTtSplit is set equal to FALSE:
//according to allowed TT block size and maximumly allowed transform size conditions
cbSize is less than or equal to 2*MinTtSizeY
cbWidth is greater than Min (VPDUSizeX, maxTtSize)
cbHeight is greater than Min (VPDUSizeY, maxTtSize)
//according to maximum allowed MTT depth conditions
mttDepth is greater than or equal to maxMttDepth
//according to whether it is located at picture boundary condition
x0+cbWidth is greater than pic_width_in_luma_samples
y0+cbHeight is greater than pic_height_in_luma_samples
Otherwise, allowTtSplit is set equal to TRUE.

6. Example Implementations of the Disclosed Technology

Figure 7:
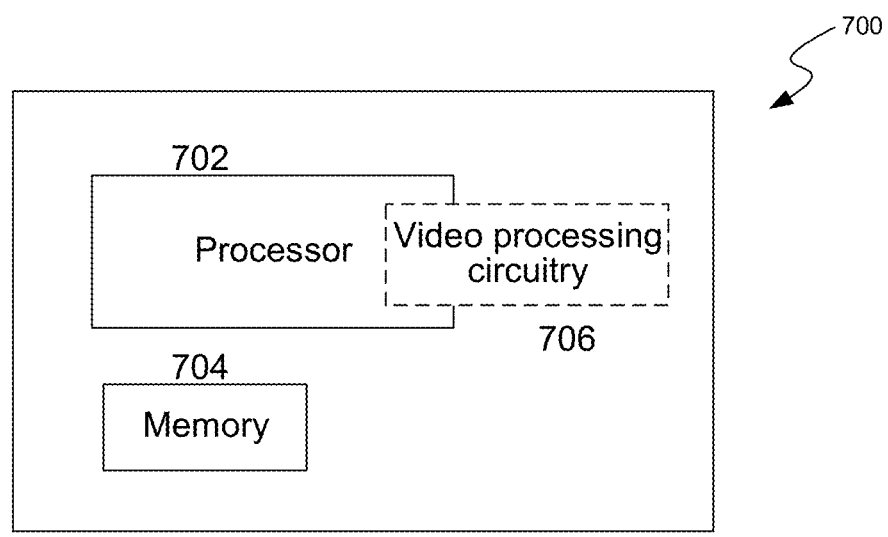
FIG. 7 is a block diagram of an example of a hardware platform for implementing a visual media decoding or a visual media encoding technique described in the present document.

FIG. 7 is a block diagram of a video processing apparatus 700. The apparatus 700 may be used to implement one or more of the methods described herein. The apparatus 700 may be embodied in a smartphone, tablet, computer, Internet of Things (IoT) receiver, and so on. The apparatus 700 may include one or more processors 702, one or more memories 704 and video processing hardware 706. The processor(s) 702 may be configured to implement one or more methods described in the present document. The memory (memories) 704 may be used for storing data and code used for implementing the methods and techniques described herein. The video processing hardware 706 may be used to implement, in hardware circuitry, some techniques described in the present document, and may be partly or completely be a part of the processors 702 (e.g., graphics processor core GPU or other signal processing circuitry).

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that the disclosed methods and techniques will benefit video encoder and/or decoder embodiments incorporated within video processing devices such as smartphones, laptops, desktops, and similar devices by allowing the use of the techniques disclosed in the present document.

Figure 8:
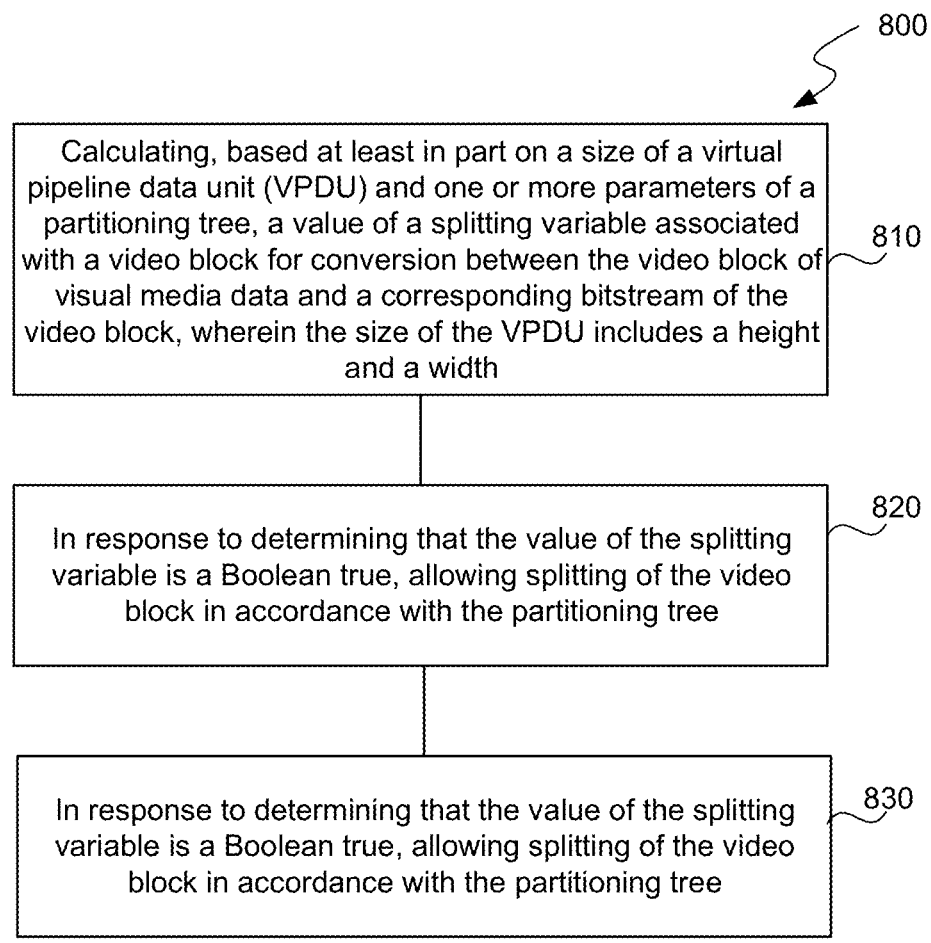
FIG. 8 shows a flowchart of an example method for video coding.

FIG. 8 is a flowchart for an example method 800 of video processing. The method 800 includes, at 810, calculating (based at least in part on a size of a virtual pipeline data unit (VPDU) and one or more parameters of a partitioning tree) a value of a splitting variable associated with a video block for conversion between the video block of visual media data and a corresponding bitstream of the video block, wherein the size of the VPDU includes a height and a width. The method 800 also includes, at 820 allowing splitting of the video block in accordance with the partitioning tree in response to determining that the value of the splitting variable is a Boolean true. The method 800 further includes, at 830, disallowing splitting of the video block in response to determining that the value of the splitting variable is a Boolean false, disallowing splitting of the video block. The term video block, as used herein, can apply to any form of media block including (but not limited to) coding block, prediction block, macro block, etc. Further, these blocks can be intra or inter blocks, in various embodiments.

Figure 9:
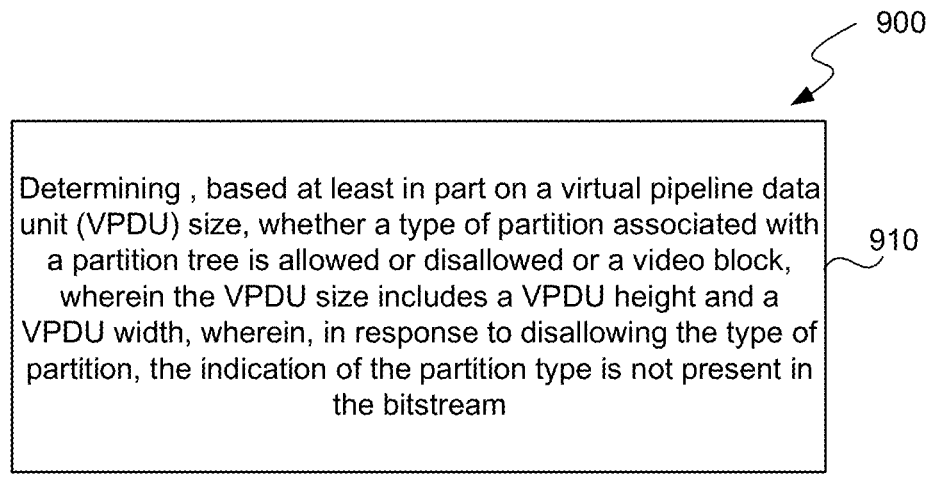
FIG. 9 shows a flowchart of an example method for video coding.

FIG. 9 is a flowchart for an example method 900 of video processing. The method 900 includes, at 910, determining, based at least in part on a virtual pipeline data unit (VPDU) size, whether a type of partition associated with a partition tree is allowed or disallowed or a video block, wherein the VPDU size includes a VPDU height and a VPDU width, wherein, in response to disallowing the type of partition, the indication of the partition type is not present in the bitstream.

Figure 10:
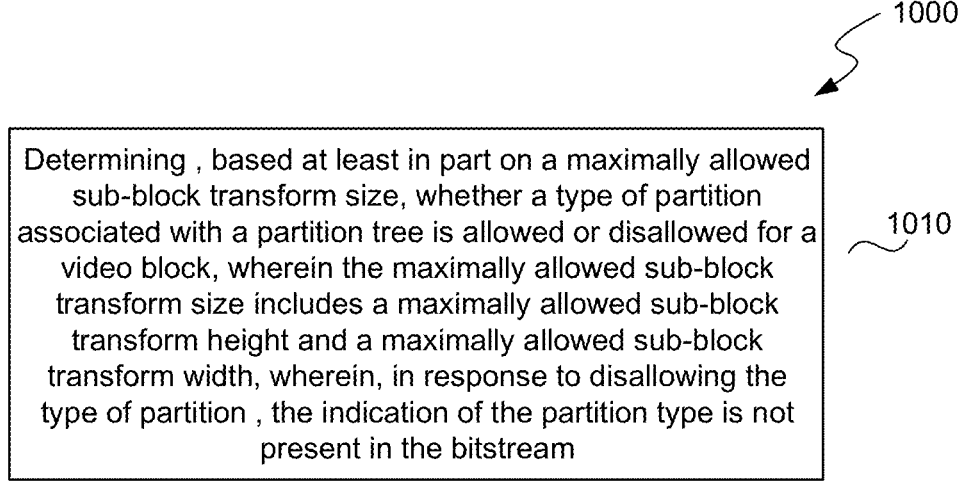
FIG. 10 shows a flowchart of an example method for video coding.

FIG. 10 is a flowchart for an example method 1000 of video processing. The method 1000 includes, at 1010, determining, based at least in part on a maximally allowed sub-block transform size, whether a type of partition associated with a partition tree is allowed or disallowed for a video block, wherein the maximally allowed sub-block transform size includes a maximally allowed sub-block transform height and a maximally allowed sub-block transform width, wherein, in response to disallowing the type of partition, the indication of the partition type is not present in the bitstream.

Figure 11:
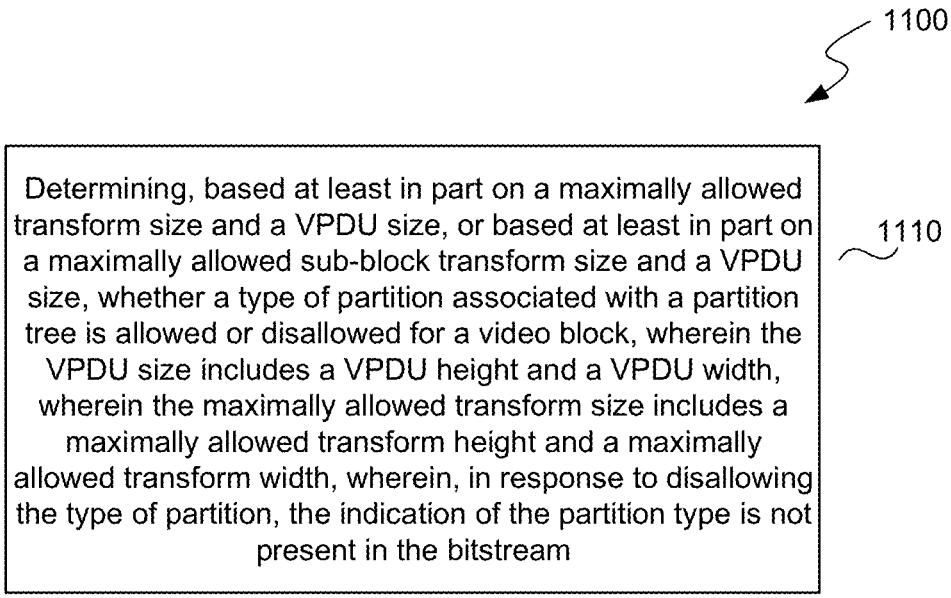
FIG. 11 shows a flowchart of an example method for video coding.

FIG. 11 is a flowchart for an example method 1100 of video processing. The method 1100 includes, at 1110, determining, based at least in part on a maximally allowed transform size and a virtual pipeline data unit (VPDU) size, or based at least in part on a maximally allowed sub-block transform size and a virtual pipeline data unit (VPDU) size, whether a type of partition associated with a partition tree is allowed or disallowed for a video block, wherein the VPDU size includes a VPDU height and a VPDU width, wherein the maximally allowed transform size includes a maximally allowed transform height and a maximally allowed transform width, wherein, in response to disallowing the type of partition, the indication of the partition type is not present in the bitstream.

Figure 12:
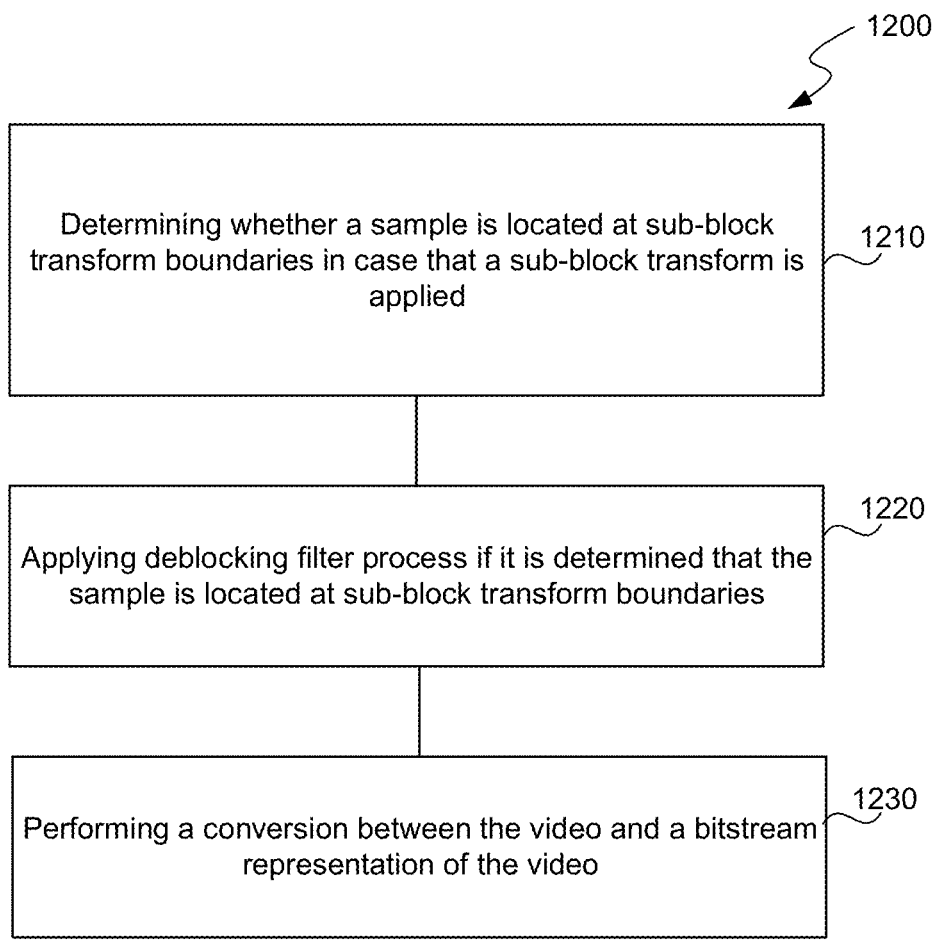
FIG. 12 shows a flowchart of an example method for video coding.

FIG. 12 is a flowchart for an example method 1200 of video processing. The method 1200 includes, at 1210, determining whether a sample is located at sub-block transform boundaries in case that a sub-block transform is applied; at 1220, applying deblocking filter process if it is determined that the sample is located at sub-block transform boundaries; and at 1230, performing a conversion between the video and a bitstream representation of the video.

Figure 13:
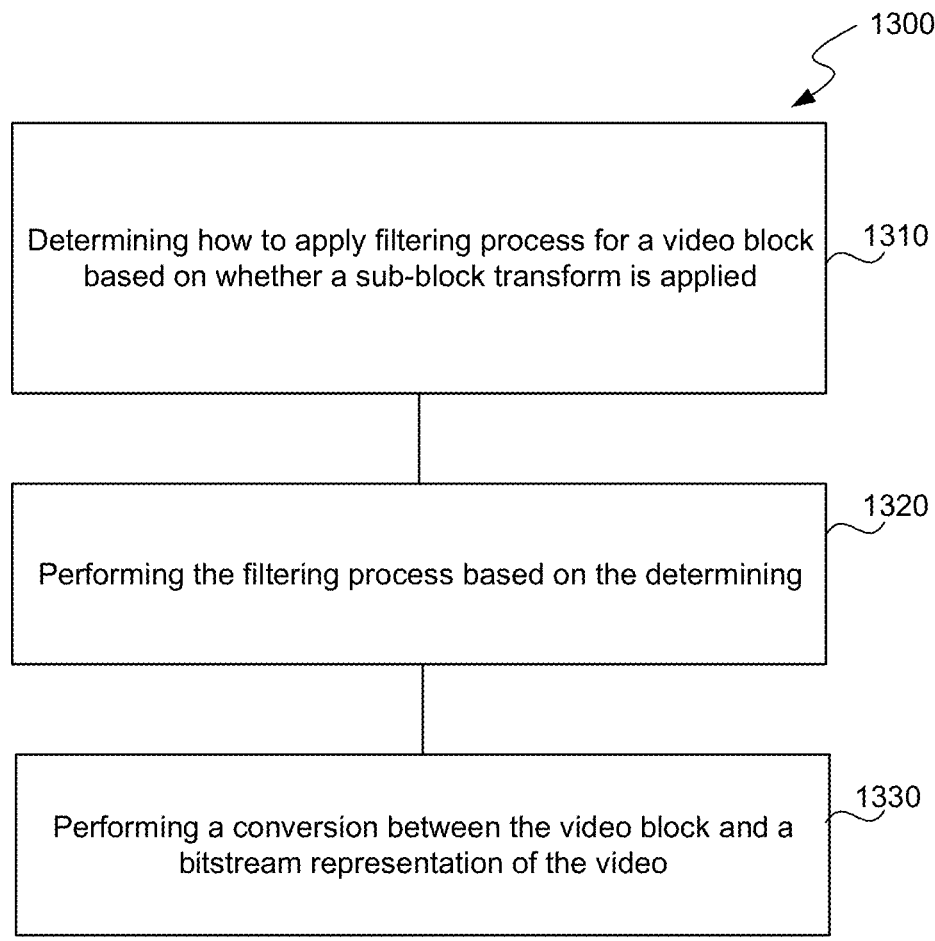
FIG. 13 shows a flowchart of an example method for video coding.

FIG. 13 is a flowchart for an example method 1300 of video processing. The method 1300 includes, at 1310, determining how to apply filtering process for a video block based on whether a sub-block transform is applied; at 1320, performing the filtering process based on the determining; and at 1330, performing a conversion between the video block and a bitstream representation of the video.

Some embodiments may be described using the following clause-based format.

1. A method of video processing, comprising:
determining whether a sample is located at sub-block transform boundaries in case that a sub-block transform is applied;

applying deblocking filter process if it is determined that the sample is located at sub-block transform boundaries; and performing a conversion between the video and a bitstream representation of the video.

2. The method of clause 1, further comprising: determining to apply a strong deblocking filter based on the sample is located at sub-block transform boundaries.

3. The method of clause 1, further comprising: determining to apply a weak deblocking filter based on the sample is located at sub-block transform boundaries.

4. The method of clause 1, further comprising: determining a filter type to be applied based on the sample is located at sub-block transform boundaries.

5. The method of clause 1, further comprising: determining how to apply clipping to the filtered sample.

6. A method of video processing, comprising:

determining how to apply filtering process for a video block based on whether a sub-block transform is applied;

performing the filtering process based on the determining; and performing a conversion between the video block and a bitstream representation of the video.

7. The method of clause 6, wherein the filtering process includes at least one of: deblocking filter process, sample adaptive offset (SAO) filter process, or adaptive loop filter (ALF) process.

8. The method of clause 7, wherein the boundary of sub-block transform is treated as a transform boundary in the deblocking filter process.

9. The method of clause 8, wherein if sub-block transform is applied, at least a boundary of sub-block transform is filtered in the deblocking filter process.

10. The method of any of clauses 1 to 9, when the sub-block transform is applied to the video block, the video block is split to more than one sub-blocks and only one of the sub-block has non-zero transform coefficients and the others don't have; and the transform coefficients are only signaled for the only one sub-block.

11. A video decoding apparatus comprising a processor configured to implement a method recited in one or more of clauses 1 to 10.

12. A video encoding apparatus comprising a processor configured to implement a method recited in one or more of clauses 1 to 10.

13. A computer program product having computer code stored thereon, the code, when executed by a processor, causes the processor to implement a method recited in any of clauses 1 to 10.

14. An apparatus in a video system comprising a processor and a non-transitory memory with instructions thereon, wherein the instructions upon execution by the processor, cause the processor to implement the method in any one of clauses 1 to 10.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method of video processing, comprising:
   determining whether to apply and how to apply a filtering process for samples of a current video unit of a video based on whether the samples are located at predefined transform boundaries; and
   performing a conversion between the video and a bitstream of the video based on the determining;
   wherein the predefined transform boundaries are determined based on a first transform mode in which a transform region is split into multiple transform sub-regions and only one transform sub-region has a non-zero prediction residual sample, and
   wherein the first transform mode is only allowed to a transform region with an inter prediction mode.

2. The method of claim 1, wherein the filtering process is applied based on the samples that are located at the predefined transform boundaries.

3. The method of claim 2, wherein at least one of the samples is non-zero.

4. The method of claim 1, wherein a size of the transform sub-region having the non-zero prediction residual sample is smaller than or equal to the other transform sub-region.

5. The method of claim 2, wherein at least a boundary of the predefined transform boundaries is filtered in the filtering process based on the samples that are located at the predefined transform boundaries.

6. The method of claim 1, wherein the filtering process is a deblocking filter process.

7. The method of claim 1, wherein a boundary strength value is determined based on the predefined transform boundaries.

8. The method of claim 1, wherein the conversion includes encoding the video into the bitstream.

9. The method of claim 1, wherein the conversion includes decoding the video from the bitstream.

10. An apparatus for processing video data comprising a processor and a non-transitory memory with instructions thereon, wherein the instructions upon execution by the processor, cause the processor to:
    determine whether to apply and how to apply a filtering process for samples of a current video unit of a video based on whether the samples are located at predefined transform boundaries; and
    perform a conversion between the video and a bitstream of the video based on the determining;
    wherein the predefined transform boundaries are determined based on a first transform mode in which a transform region is split into multiple transform sub-regions and only one transform sub-region has a non-zero prediction residual sample, and
    wherein the first transform mode is only allowed to a transform region with an inter prediction mode.

11. The apparatus of claim 10, wherein the filtering process is applied based on the samples that are located at the predefined transform boundaries.

12. The apparatus of claim 11, wherein at least one of the samples is non-zero.

13. The apparatus of claim 10, wherein a size of the transform sub-region having the non-zero prediction residual sample is smaller than or equal to the other transform sub-region.

14. The apparatus of claim 11, wherein at least a boundary of the predefined transform boundaries is filtered in the filtering process based on the samples that are located at the predefined transform boundaries.

15. The apparatus of claim 10, wherein the filtering process is a deblocking filter process.

16. The apparatus of claim 10, wherein a boundary strength value is determined based on the predefined transform boundaries.

17. A non-transitory computer-readable storage medium storing instructions that cause a processor to:
    determine whether to apply and how to apply a filtering process for samples of a current video unit of a video based on whether the samples are located at predefined transform boundaries; and
    perform a conversion between the video and a bitstream of the video based on the determining;
    wherein the predefined transform boundaries are determined based on a first transform mode in which a transform region is split into multiple transform sub-regions and only one transform sub-region has a non-zero prediction residual sample, and
    wherein the first transform mode is only allowed to a transform region with an inter prediction mode.

18. A non-transitory computer-readable recording medium storing a bitstream of a video which is generated by a method performed by a video processing apparatus, wherein the method comprises:
    determining whether to apply and how to apply a filtering process for samples of a current video unit of a video based on whether the samples are located at predefined transform boundaries; and
    generating a bitstream of the video based on the determining;
    wherein the predefined transform boundaries are determined based on a first transform mode in which a transform region is split into multiple transform sub-regions and only one transform sub-region has a non-zero prediction residual sample, and
    wherein the first transform mode is only allowed to a transform region with an inter prediction mode.

19. The non-transitory computer-readable storage medium of claim 17, wherein the filtering process is applied based on the samples that are located at the predefined transform boundaries, and wherein a size of the transform sub-region having non-zero prediction residual sample is smaller than or equal to the other transform sub-region.

20. The non-transitory computer-readable recording medium of claim 18, wherein the filtering process is applied based on the samples that are located at the predefined transform boundaries, and wherein a size of the transform sub-region having non-zero prediction residual sample is smaller than or equal to the other transform sub-region.

\* \* \* \* \*